(12) United States Patent       (10) Patent No.:     US 12,304,448 B2
Lim                             (45) Date of Patent:        May 20, 2025

(54) ELECTRO-MECHANICAL BRAKE AND CONTROL METHOD THEREOF

(71) Applicant: HYUNDAI MOBIS CO., LTD., Seoul (KR)

(72) Inventor: Dong Hwan Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 259 days.

(21) Appl. No.: 17/886,637

(22) Filed: Aug. 12, 2022

(65) Prior Publication Data

US 2023/0365107 A1    Nov. 16, 2023

(30) Foreign Application Priority Data

May 12, 2022   (KR) .......................... 10-2022-0058472

(51) Int. Cl.
*B60T 8/171*   (2006.01)
*B60T 8/172*   (2006.01)
(Continued)

(52) U.S. Cl.
CPC .............. *B60T 8/172* (2013.01); *B60T 8/171* (2013.01); *B60T 8/173* (2013.01); *B60T 13/746* (2013.01)

(58) Field of Classification Search
CPC .......... B60T 8/172; B60T 8/171; B60T 8/173; B60T 13/746
See application file for complete search history.

(56) References Cited

U.S. PATENT DOCUMENTS

2012/0193177 A1*   8/2012   Goto ....................... F16D 65/18
                                                        188/161
2018/0079403 A1    3/2018   Masuda et al.
(Continued)

FOREIGN PATENT DOCUMENTS

JP         2000-338119 A       12/2000
KR    10-2013-0117235 A        10/2013
(Continued)

OTHER PUBLICATIONS

Office Action issued on Nov. 13, 2023 in Korean Patent Application No. 10-2022-0058472 with English translation.
(Continued)

*Primary Examiner* — Jacob M Amick
(74) *Attorney, Agent, or Firm* — Morgan, Lewis & Bockius LLP

(57) ABSTRACT

The present disclosure provides an electro-mechanical brake including a piston configured to push a brake pad towards a wheel disc by driving a motor, the electro-mechanical brake comprising: a position detection unit that detects the position of the piston; a current detection unit that detects the value of current applied to the motor; and a contact point calculation unit that calculates a contact point, which is where the piston is located when the brake pad starts to come into contact with the wheel disc, based on the position of the piston and the value of current applied to the motor, wherein the contact point calculation unit calculates the contact point based on the position of the piston detected by the position detection unit with respect to a plurality of specified current values and the position of the piston measured with respect to the plurality of specified current values.

18 Claims, 17 Drawing Sheets

(51) Int. Cl.
    *B60T 8/173*     (2006.01)
    *B60T 13/74*     (2006.01)

(56) References Cited

U.S. PATENT DOCUMENTS

2022/0399849 A1   12/2022   Kim
2023/0072617 A1    3/2023   Lim

FOREIGN PATENT DOCUMENTS

| KR | 10-2021-0065717 A | 6/2021 |
| KR | 10-2021-0157630 A | 12/2021 |
| KR | 10-2022-0036480 A | 3/2022 |
| KR | 10-2022-0045485 A | 4/2022 |

OTHER PUBLICATIONS

Extended European Search Report dated May 30, 2023, issued in corresponding European Patent Application No. 22192085.3.

* cited by examiner

ELECTRO-MECHANICAL BRAKE AND CONTROL METHOD THEREOF

CROSS-REFERENCE TO RELATED APPLICATION

This application claims priority to and the benefit of Korean Patent Application No. 10-2022-0058472, filed on May 12, 2022, the disclosure of which is incorporated herein by reference in its entirety.

TECHNICAL FIELD

The present disclosure relates to an electro-mechanical brake and a control method thereof.

BACKGROUND

The content described in this section merely provides the background information on the present disclosure and does not constitute the prior art.

An Electro-Mechanical Brake (EMB) is being widely used. The electro-mechanical brake was developed as an Electronic Parking Brake (EPB), but the field of use of the brake is expanding to a main brake which substitutes for a conventional hydraulic brake. The EMB is a device in which an actuator driven by a motor is mounted on a brake caliper, so that a vehicle is directly braked by a motor driving force without a medium such as brake fluid. Since the EMB has a mechanism similar to that of the Electronic Parking Brake (EPB) but is mainly used for main braking unlike the EPB, the EMB requires higher braking response and operation durability than those of the EPB. Further, the electro-mechanical brake may be simpler in structure, be higher in braking response speed, and be more precisely controlled compared to the hydraulic brake, thereby improving braking stability.

An electro-mechanical brake with a force sensor mounted to it is able to accurately measure clamping force. However, mounting a force sensor to an electro-mechanical brake complicates the design and raises the manufacturing cost. The mounting of the sensor also increases the size of the electro-mechanical brake.

To solve the problem of the rise in manufacturing cost and the problem of the increase in equipment size, a current sensor may be used instead of a force sensor to estimate clamping force. The electro-mechanical brake may be designed in such a way that the current sensor measures a current applied to a motor that generates braking force and estimates clamping force based on the measured current. However, a problem with the estimating of clamping force by measuring a current applied to the motor is that this method has lower accuracy compared to using a force sensor, due to a measurement noise from the current sensor.

FIGS. 12A, 12B and 12C are view showing a construction of a conventional electro-mechanical brake.

Referring to FIGS. 12A to 12C, the electro-mechanical brake includes a wheel disc 12_c, a pair of brake pads 12_b disposed on both sides of the wheel disc 12_c, and a piston 12a configured to push the brake pads 12_b towards the wheel disc 12_c. The further the piston 12_a moves towards the wheel disc 12_c, the greater the braking force. Still, even if the relative positions of the piston 12_a and the brake pads 12_b are the same, the braking force varies with the movement path of the piston 12_a. That is, the braking force relative to the position of the piston 12_a has a hysteresis characteristic. Therefore, accurate estimation of braking force requires consideration of the movement path of the piston 12_a.

SUMMARY

According to at least one aspect, the present disclosure provides an electro-mechanical brake comprising a piston to push a brake pad towards a wheel disc by driving a motor in a vehicle; a position detection unit that detects a position of the piston based on a plurality of specified current values; a current detection unit that detects a value of current applied to the motor; and a contact point calculation unit that calculates a contact point, which is where the piston is located when the brake pad starts to come into contact with the wheel disc, based on the position of the piston and the value of the current applied to the motor, or based on a first position of the piston detected by the position detection unit with respect to a plurality of specified current values and a second position of the piston measured with respect to the plurality of specified current values.

According to another aspect, the present disclosure provides a control method of an electro-mechanical brake comprising a piston to push a brake pad towards a wheel disc by driving a motor in a vehicle, the control method comprising: a position detection process including detecting, by a position detection unit, a position of the piston; a current detection process including detecting, by a current detection unit, a value of current applied to the motor; and a contact point calculation process including calculating, by a contact point calculation unit, a contact point, which is where the piston is located when the brake pad starts to come into contact with the wheel disc, is calculated based on the position of the piston and the value of current applied to the motor, or based on a first position of the piston detected by the position detection unit with respect to a plurality of specified current values and a second position of the piston measured with respect to the plurality of specified current values.

DETAILED DESCRIPTION

Figure 1:
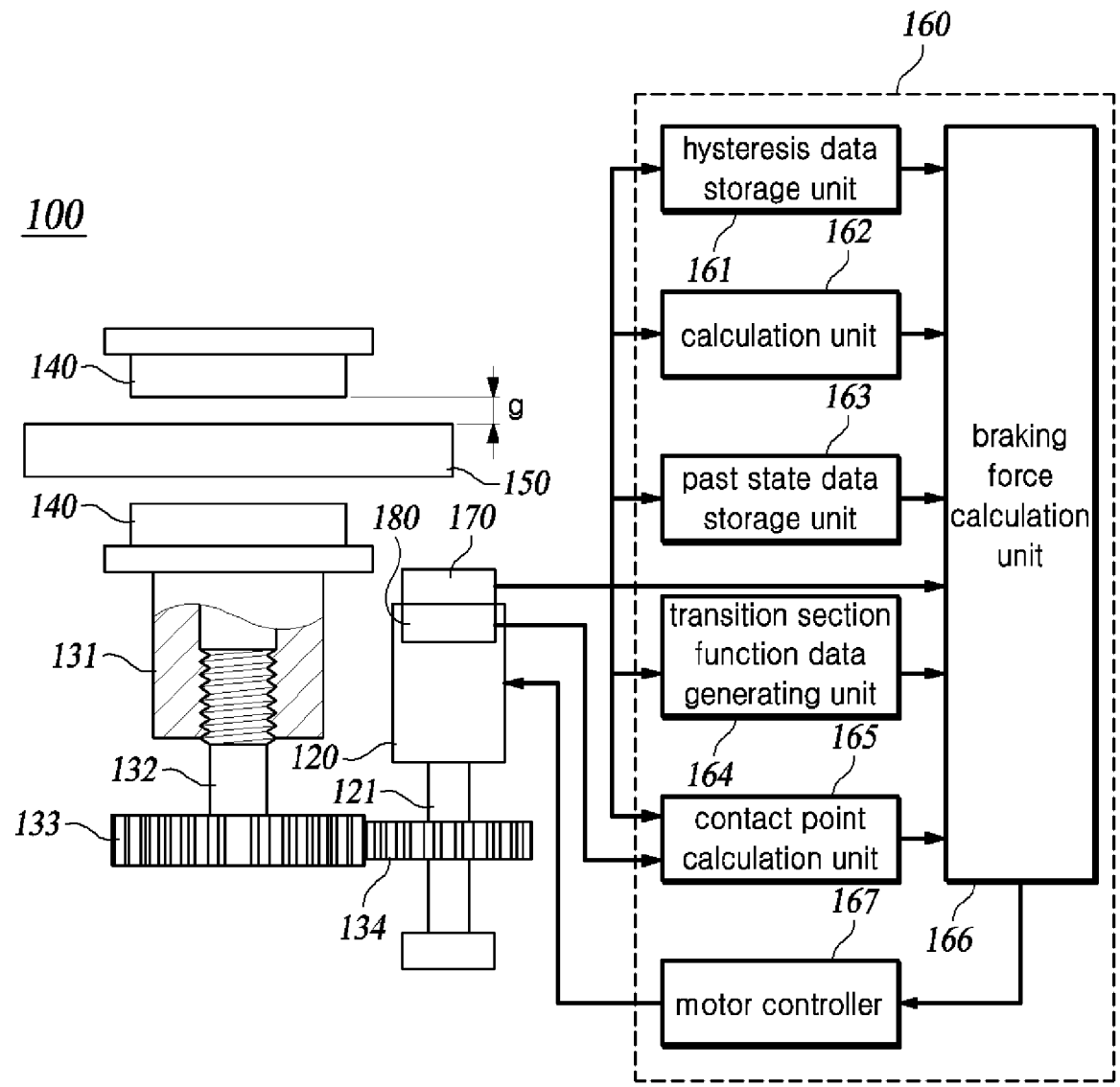
FIG. 1 is a view showing a construction of an electro-mechanical brake according to an embodiment of the present disclosure.

An electro-mechanical brake according to an embodiment of the present disclosure is able to estimate force based on a current applied to a motor and the position of a piston.

An electro-mechanical brake according to an embodiment of the present disclosure is able to accurately calculate force by calculating and/or calibrating a contact point based on a current applied to a motor and the position of a piston.

An electro-mechanical brake according to an embodiment of the present disclosure is able to accurately calculate force by calibrating the stiffness of a caliper and an abrasion of pads based on a current applied to a motor and the position of a piston.

An electro-mechanical brake according to an embodiment of the present disclosure is able to accurately calculate braking force based on a hysteresis characteristic of the braking force relative to the position of a piston.

The aspects of the present disclosure are not limited to the foregoing, and other aspects not mentioned herein will be able to be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a view showing a construction of an electro-mechanical brake according to an embodiment of the present disclosure.

Referring to FIG. 1, the electro-mechanical brake according to an embodiment of the present disclosure includes all or some of a wheel disc 150, a brake pad 140, a piston 131, a motor 120, a current detection unit 180, a position detection unit 170, a hysteresis data storage unit 161, a calculation unit 162, a past state data storage unit 163, a transition section function data generating unit 164, a contact point calculation unit 165, a braking force calculation unit 166, and a motor controller 167.

The wheel disc 150 is coupled to a wheel of a vehicle. The wheel disc 150 is rotated along with the wheel of the vehicle. By restricting the rotation of the wheel disc 150, the vehicle may be braked. The brake pad 140 is disposed on a side of the wheel disc 150. The piston 131 is configured to push the brake pad 140 toward the wheel disc 150 by driving the motor 120. As the piston 131 presses the brake pad 140 toward the wheel disc 150, a frictional force is generated between the brake pad 140 and the wheel disc 150. Due to the frictional force generated between the brake pad 140 and the wheel disc 150, the rotation of the wheel disc 150 is restricted. The motor 120 supplies power to the piston 131.

A process in which the piston 131 receives power from the motor 120 and then is driven will be described. A driving gear 134 is rotated along with a rotating shaft 121 of the motor 120 by driving the motor 120. The driving gear 134 engages with a driven gear 133. When the driving gear 134 rotates, the driven gear 133 is also rotated. The driven gear 133 is coupled to a screw shaft 132. The screw shaft 132 rotates in conjunction with the rotation of the driven gear 133. A screw thread is formed on the outer circumference of the screw shaft 132. A screw groove having a shape corresponding to that of the screw thread of the screw shaft 132 is formed on the inner circumference of the piston 131. If the screw shaft 132 is rotated along with the driven gear 133, the piston 131 moves rectilinearly while being fastened to or unfastened from the screw shaft 132. If the piston 131 moves rectilinearly toward the wheel disc 150, the brake pad 140 is pushed toward the wheel disc 150 by the piston 131.

The position detection unit 170 detects the position of the piston 131. The position of the piston 131 represents a distance from a lowest point of a stroke of the piston 131 to the piston 131. Here, the stroke lowest point refers to the position of the brake pad 140 when the brake pad 140 is maximally spaced apart from the wheel disc 150.

The position detection unit 170 may include an angle sensor. The angle sensor measures the angular displacement of the rotating shaft 121 of the motor 120. The position detection unit 170 may calculate the rectilinear moving distance of the piston 131 using the angular displacement of the rotating shaft 21 sensed by the angle sensor. The rectilinear moving distance of the piston 131 according to the rotating angle of the motor 120 may vary depending on the design of the electro-mechanical brake. For instance, the electro-mechanical brake may be designed such that the rectilinear moving distance of the piston 131 is 1 mm while the rotating shaft 121 of the motor 120 is rotated at 360 degrees.

Figure 2A:
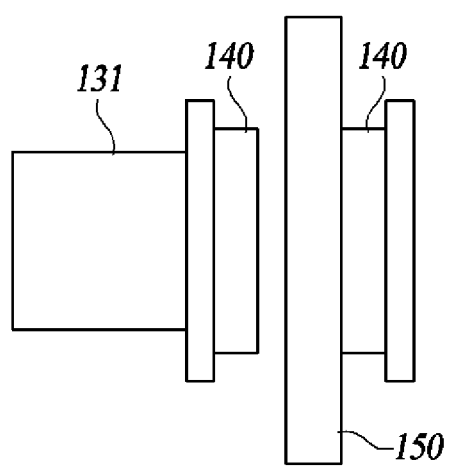
FIGS. 2A to 2C are view showing an operating state of an electro-mechanical brake according to an embodiment of the present disclosure.
Figure 2B:
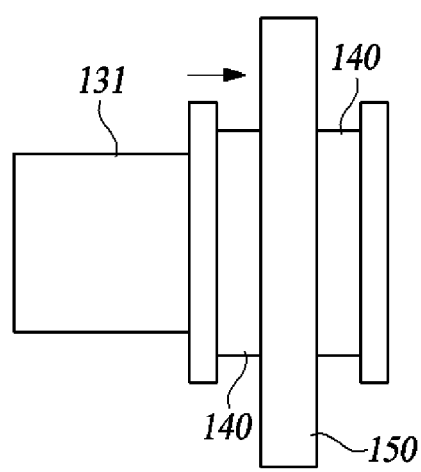
Figure 2C:
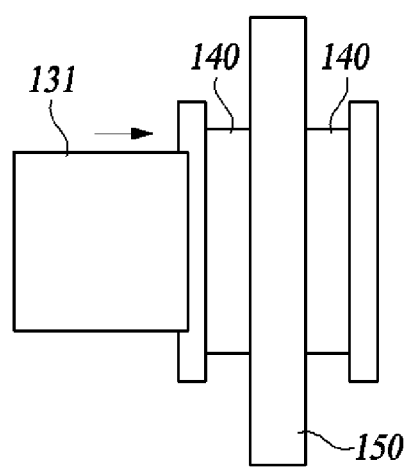

FIGS. 2A to 2C are view showing an operating state of an electro-mechanical brake according to an embodiment of the present disclosure.

Referring to FIG. 2A, when the brake pad 140 is spaced apart from the wheel disc 150, no braking force is generated. Here, the braking force is the force for braking the vehicle. When the piston 131 pushes the brake pad 140 so that the brake pad 140 contacts the wheel disc 150 as shown in FIG. 2B, frictional force is generated between the brake pad 140 and the wheel disc 150. The frictional force generated between the brake pad 140 and the wheel disc 150 acts as the braking force. The position of the piston 131 where the brake pad 140 starts to contact the wheel disc 150 is referred to as a contact point. As shown in FIG. 2C, when the piston 131 passes through the contact point and moves toward the wheel disc 150, the force of the piston 131 pressing the brake pad 140 is increased. Here, the force of the piston 131 pressing the brake pad 140 is referred to as clamping force. If the clamping force increases, the frictional force generated between the brake pad 140 and the wheel disc 150 increases. That is, the braking force increases.

The electro-mechanical brake according to an embodiment of the present disclosure may estimate the clamping force not by using a load sensor but by using a current sensor and a position sensor.

The position detection unit 170 may precisely measure the position of the piston 131 using the angle sensor. However, since the contact point varies depending on the wear state of the brake pad 140, the position of the contact point cannot be recognized only by the position of the piston 131. If the contact point is not recognized, it is difficult to precisely estimate the clamping force according to the position of the piston 131.

The current detection unit 180 detects the value of current flowing through the motor 120. The control unit 160 feeds back the current value detected by the current detection unit 180 to control the motor 120. The electro-mechanical brake device according to an embodiment of the present disclosure identifies the position of the contact point using current control.

Figure 3:
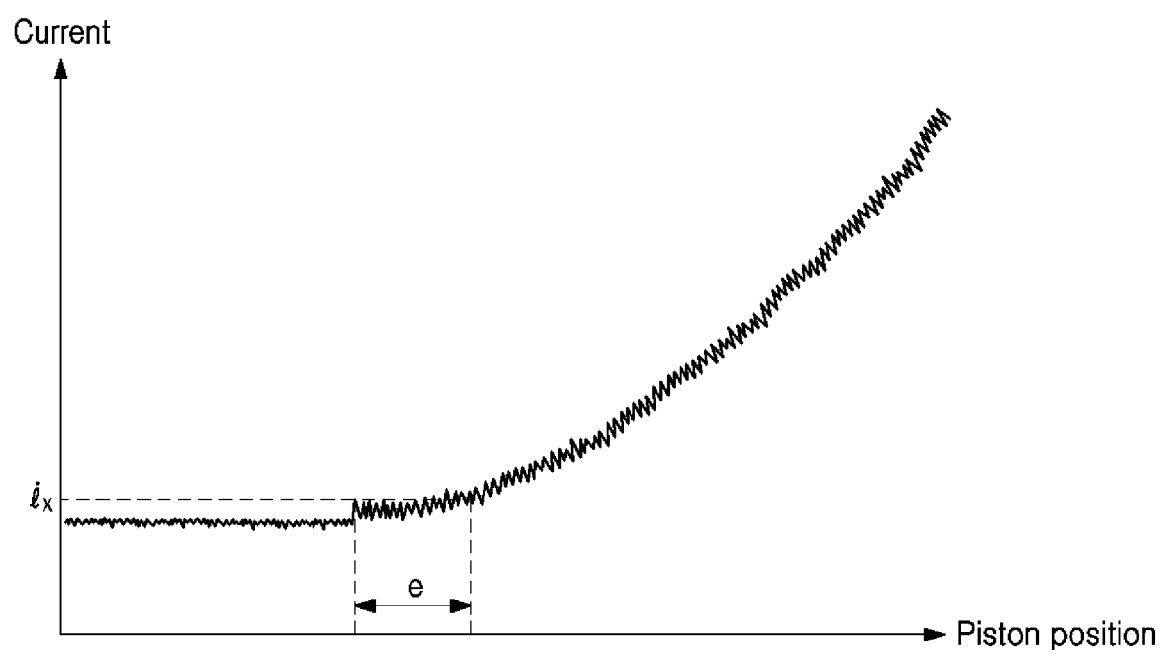
FIG. 3 is a graph of the current versus moving distance of a braking pad according to an embodiment of the present disclosure.

FIG. 3 is a graph of the current versus moving distance of a braking pad according to an embodiment of the present disclosure.

Referring to FIG. 3, the value of current applied to the motor 120 increases in proportion to the position of the piston 131. The value of current applied to the motor 120 may increase in proportion to clamping force. However, it is difficult to precisely calculate clamping force because measurements by a current sensor have a large margin of error. Referring to FIG. 3, if the current sensor detects a value ix to be a contact point, a large margin of error (e) is generated due to a measurement noise in the current sensor. The current detection unit 180 according to an embodiment of the present disclosure may include a current sensor that measures a current applied to the motor 120 and a filter (not shown) that removes noise from the measured current. Here, the filter may be a low-pass filter. Using the current sensor alone, a current value corresponding to a contact point may be measured from a plurality of points due to a measurement noise. The contact point calculation unit 165 may calculate a contact point by using a current from which noise is removed by the filter.

In removing a measurement noise in the current sensor using the filter, a time delay may occur. However, this may be solved by moving the piston 131 at a constant speed over time so that the same amount of time delay occurs across the entire range.

Figure 4:
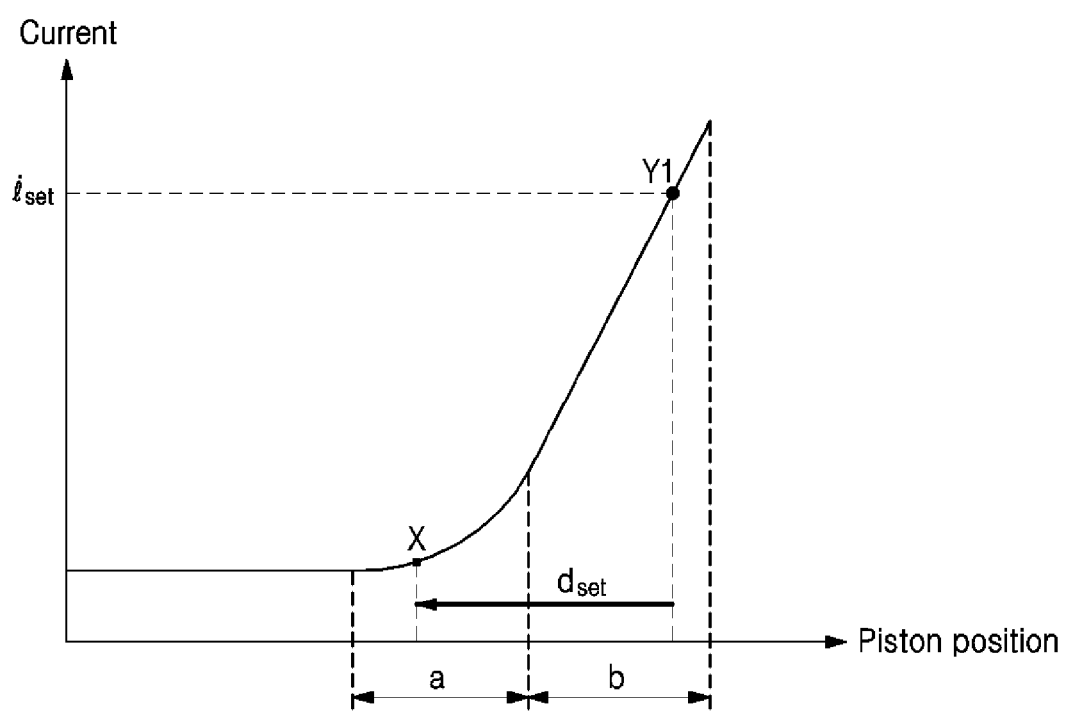
FIG. 4 is a graph depicting a method of estimating a contact point of an electro-mechanical brake according to an embodiment of the present disclosure.

FIG. 4 is a graph depicting a method of estimating a contact point of an electro-mechanical brake according to an embodiment of the present disclosure.

Referring to FIG. 4, the horizontal axis of the graph represents the position of the piston 131, while the vertical axis thereof represents the value of current flowing through the motor 120. As it proceeds to the right on the horizontal axis of the graph, a gap g (see FIG. 1) between the brake pad 140 and the wheel disc 150 is reduced.

The current value of the motor 120 is maintained at a substantially constant value in a section before the contact point X, but the current value is non-linearly increased in a non-linear section a shown in FIG. 4 after the contact point. If the operating distance is further increased past the non-linear section a, the current value is linearly increased in a linear section b shown in FIG. 4. Here, the linear section b refers to a section in which the current value detected using the current detection unit 180 is linearly changed within a predetermined error range for the position of the piston 131.

The position of the piston 131 when the current detection unit 180 detects the first current value $i_{set}$ is defined as a first position Y1. The first current value $i_{set}$ that is a preset value may be a current value on the linear section b. When the first current value $i_{set}$ is the current value on the linear section b, the error range occurring in the linear section b is narrower than the error range e occurring in the non-linear section a, so that the contact point can be more accurately calculated.

The control unit 160 includes all or some of a hysteresis data storage unit 161, a calculation unit 162, a past state data storage unit 163, a transition section function data generating unit 164, a contact point calculation unit 165, a braking force calculation unit 166, and a motor controller 167.

The contact point calculation unit 165 calculates the contact point X based on the first position Y1 that is the position of the piston 131 when the first current value is detected using the current detection unit 180. The contact point calculation unit 165 calculates a second position spaced apart from the first position Y1 by a preset distance $d_{set}$ to an opposite side of the wheel disc 150 as the contact point X. The value of the preset distance $d_{set}$ that is an experimentally measured value may vary depending on the specification of the electro-mechanical brake. The control unit 160 may determine the relative positions of the brake pad 140 and the wheel disc 150 and the size of an air gap using the position sensor, based on the determined contact point X.

The motor controller 167 drives the motor 120 for a preset time when the vehicle is stopped, thus moving the piston 131 toward the wheel disc 150. The motor controller 167 may drive the motor 120 for a preset time when the vehicle is parked and the door of the vehicle is opened, thus moving the piston 131 toward the wheel disc 150. If the door is opened while the vehicle is parked, the motor controller 167 may drive the motor 120 at a preset angular speed for a preset time. Based on data on the current value for the position of the piston 131 collected for a preset time, the contact point calculation unit 165 may calculate the contact point X.

When a driver presses a brake pedal before the preset time has elapsed, the motor controller 167 drives the motor 120 at a preset angular speed for a preset time after the door of the vehicle is opened, thus moving the piston 131 toward the wheel disc 150. The motor controller 167 controls the motor 120 to generate a braking force corresponding to a braking signal immediately after a preset time has elapsed.

Figure 5:
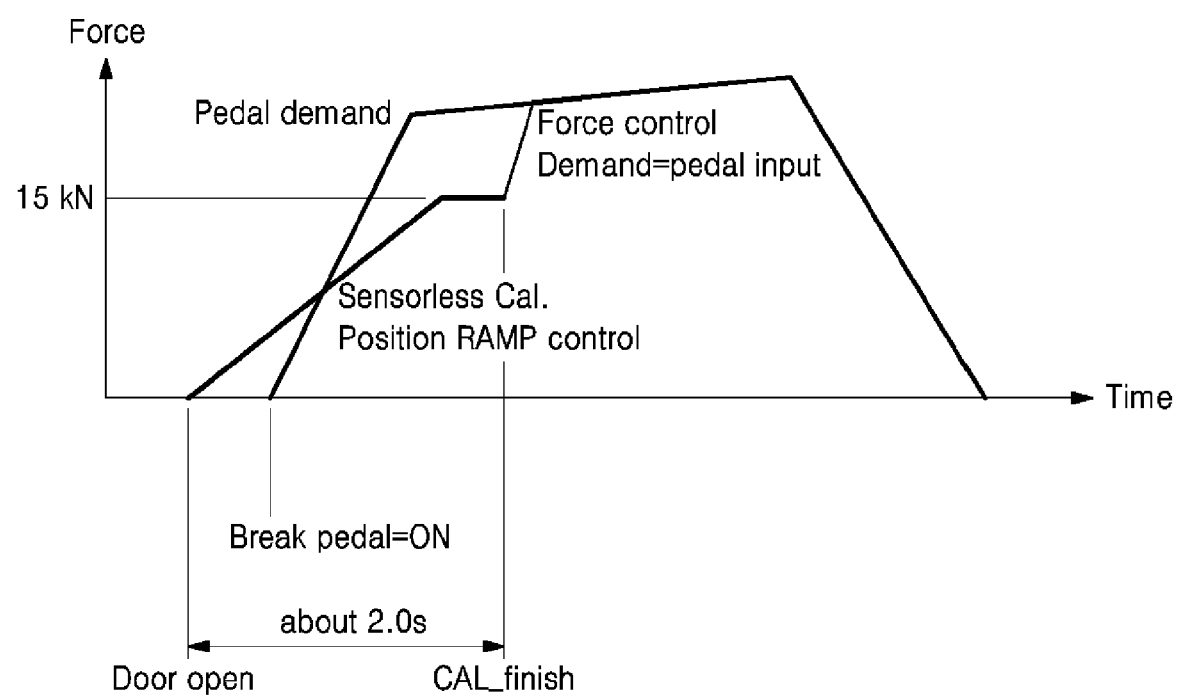
FIG. 5 is a graph showing a motor control timing for detecting a contact point of an electro-mechanical brake according to an embodiment of the present disclosure.

FIG. 5 is a graph showing a motor control timing for detecting a contact point of an electro-mechanical brake according to an embodiment of the present disclosure.

Referring to FIG. 5, if the door is opened while the vehicle is stopped, the motor controller 167 drives the motor 120 at a predetermined angular speed for about 2 seconds to move the piston 131 toward the wheel disc 150. In the present disclosure, an operation in which the motor controller 167 drives the motor 120 at a predetermined angular speed for a preset time is referred to as ramp driving. The contact point calculation unit 165 identifies the contact point based on the current value data for the position of the piston 131 acquired by the ramp driving.

If a driver presses the pedal before the ramp driving is finished, the motor controller 167 controls the motor 120 to generate the braking force corresponding to the braking signal that is input using the brake pedal immediately after the ramp driving is finished. The ramp driving is performed while the vehicle is parked. Thus, even if the braking force that does not correspond to the braking signal generated by the driver is generated during the ramp driving, the driver cannot see that the braking force that does not correspond to the braking signal is generated.

The motor controller 167 controls the motor 120 so that the electro-mechanical brake generates a demand braking force based on the braking force calculated by the braking force calculation unit 166.

Figure 6:
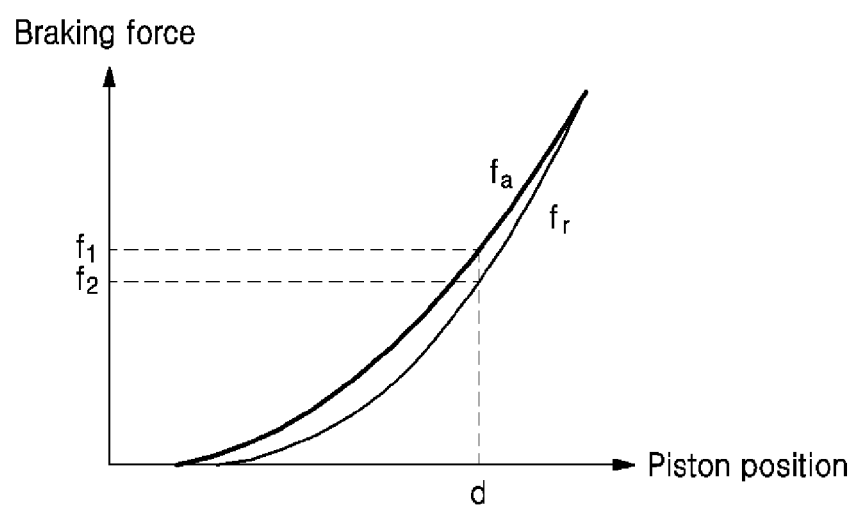
FIG. 6 is a graph showing the amount of braking force with respect to the position and moving direction of a piston according to an embodiment of the present disclosure.

FIG. 6 is a graph showing the amount of braking force with respect to the position and moving direction of a piston according to an embodiment of the present disclosure.

Referring to FIG. 6, the horizontal axis of the graph represents the position of the piston 131. When the piston 131 is at the lowest point of the stroke, the position of the piston 131 is set to 0. The vertical axis of the graph represents the braking force. The braking force is not determined only by the position of the piston 131. Even if the piston 131 is at the same position, the braking force when the piston 131 moves toward the wheel disc 150 is different from the braking force when the piston 131 moves to the opposite side of the wheel disc 150. Therefore, in order to accurately estimate the braking force, it is necessary to consider the position of the piston 131 as well as the moving path of the piston 131. In the present disclosure, a function for a rising section in which the braking force is increased as the piston 131 moves toward the wheel disc 150 is referred to as a rising section function $f_a$ (see FIG. 6), and a function for a falling section in which the braking force is reduced as the piston 131 moves to the opposite side of the wheel disc 150 is referred to as a falling section function $f_a$ (see FIG. 6).

Figure 7:
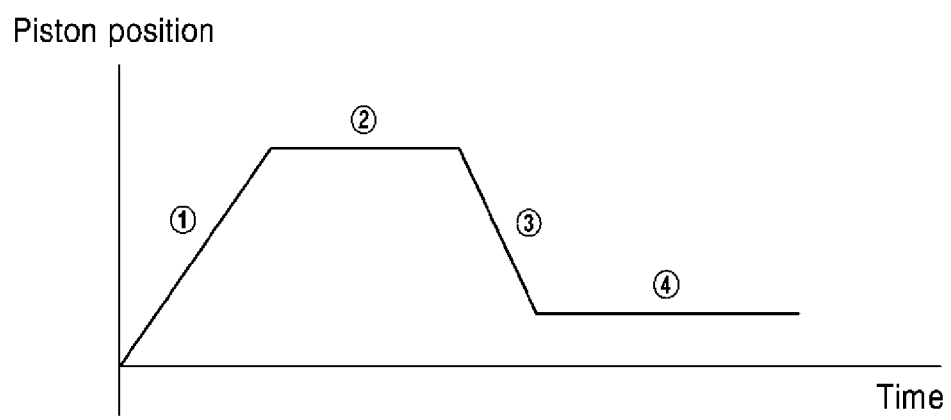
FIG. 7 is a graph depicting a process of calculating the braking force of an electro-mechanical brake according to an embodiment of the present disclosure.

FIG. 7 is a graph depicting a process of calculating the braking force of an electro-mechanical brake according to an embodiment of the present disclosure.

Referring to FIG. 7, the vertical axis of the graph of FIG. 7 represents the position of the piston 131. When the piston 131 is at the lowest point of the stroke, the position of the piston 131 is set to 0. The horizontal axis of the graph represents an elapsed time.

The moving state of the piston 131 of the electro-mechanical brake may be divided into four states. In state ①, the piston 131 moves toward the wheel disc 150. That is, a differential value of the position of the piston 131 with respect to time is a positive number. In state ③, the position of the piston 131 with time is reduced. That is, the differential value of the position of the piston 131 with respect to time is a negative number. In state ② and state ④, the position of the piston 131 is not changed. In other words, the differential value of the position of the piston 131 with respect to time is 0. State ② and state ④ are divided depending on the moving state of the piston 131 just before the piston 131 is stopped. If the differential value of the position of the piston 131 is the positive number before the piston 131 is stopped, this may be defined as state ②. If the differential value of the position of the piston 131 is the negative number before the piston 131 is stopped, this may be defined as state ④. When the moving state of the piston 131 is state ① or state ②, the braking force for the position of the piston 131 is determined according to the rising section function. When the moving state of the piston 131 is state ③ or state ④, the braking force for the position of the piston 131 is determined according to the falling section function.

The hysteresis data storage unit 161 stores data on the rising section function $f_a$ (see FIG. 6) for the rising section, and data on the falling section function $f_r$ (see FIG. 6) for the falling section.

The calculation unit 162 calculates the differential value of the position of the piston 131 with respect to time. The past state data storage unit 163 stores data on a preceding section corresponding to the position of a preceding piston 131.

The braking force calculation unit 166 may calculate the braking force based on the differential value of the position of the piston 131 and data on the preceding section. The braking force calculation unit 166 follows the rising section function to calculate the braking force when the differential value of the position of the piston 131 with respect to time is the positive number. When the differential value of the position of the piston 131 with respect to time is the negative number, the braking force calculation unit follows the falling section function to calculate the braking force. If the differential value of the position of the piston 131 with respect to time is 0 and the section corresponding to the position of the preceding piston 131 is the rising section, the braking force calculation unit follows the rising section function to calculate the braking force. If the differential value of the position of the piston 131 with respect to time is 0 and the section corresponding to the position of the preceding piston 131 is the falling section, the braking force calculation unit follows the falling section function to calculate the braking force. Thus, the braking force may be calculated using an appropriate function according to the moving state of the piston 131. By calculating the braking force using the appropriate function, the braking force may be more accurately calculated.

Figure 8A:
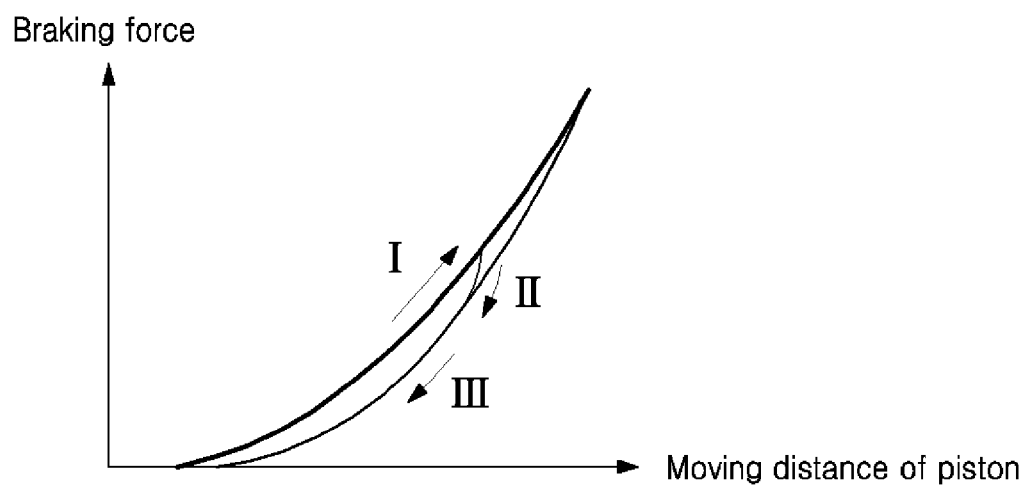
FIGS. 8A and 8B are graph depicting a transition interval function according to an embodiment of the present disclosure.
Figure 8B:
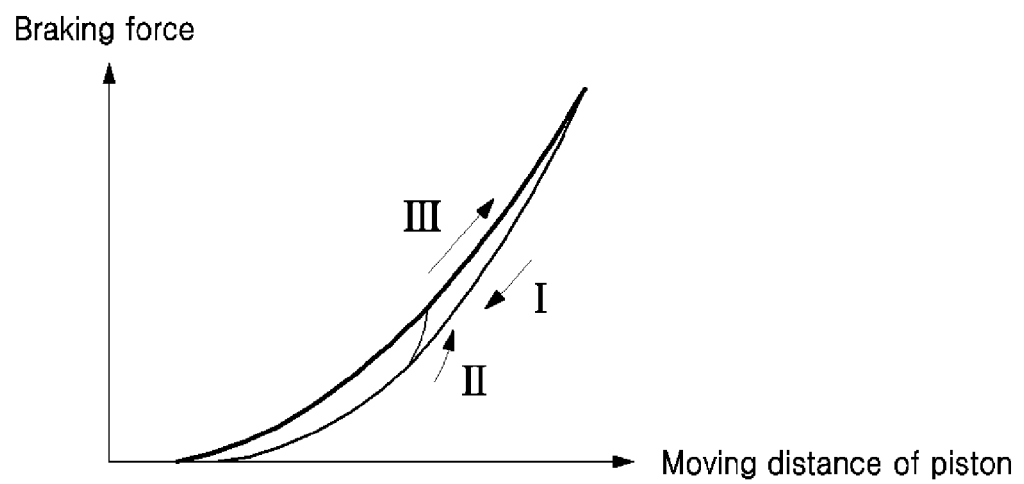

FIGS. 8A and 8B are graph depicting a transition interval function according to an embodiment of the present disclosure.

Referring to FIG. 8, when the moving direction of the piston 131 is switched at a position other than a highest point or a lowest point of the braking force, the actual braking force is continuously changed along a path Ⅱ that follows the transition section function. Here, the transition section means a section in which the braking force is transferred from any one of the rising section and the falling section to another section as the moving direction of the piston 131 is changed.

FIG. 8A is a graph showing a path in which the braking force is changed according to the moving distance of the piston when the piston moves toward the wheel disc and then moves in the opposite direction to the wheel disc.

When the piston moves toward the wheel disc and then moves in the opposite direction to the wheel disc, the magnitude of the braking force according to the moving distance of the piston is changed along the path Ⅰ while the piston moving toward the wheel disc, along the path Ⅱ in the transition section after the direction is changed, and along the path Ⅲ after the transition section.

FIG. 8B is a graph showing a path in which the braking force is changed according to the moving distance of the piston when the piston moves in the opposite direction to the wheel disc and then moves toward the wheel disc.

When the piston moves in the opposite direction to the wheel disc and then moves toward the wheel disc, the magnitude of the braking force according to the moving distance of the piston is changed along the path Ⅰ while the piston moving in the opposite direction to the wheel disc, along the path Ⅱ in the transition section after the direction is changed, and along the path Ⅲ after the transition section.

The function value of the transition section function has a value that is greater than the function value of the falling section function $f_r$ (see FIG. 6) and is smaller than the function value of the rising section function $f_a$ (see FIG. 6). If the braking force calculation unit 166 calculates the braking force only by the rising section function $f_a$ (see FIG. 6) or the falling section function $f_r$ (see FIG. 6), a difference occurs between the braking force calculated using the braking force calculation unit 166 in the transition section and an actual braking force. Therefore, the electro-mechanical brake according to an embodiment of the present disclosure includes a transition section function data generating unit 164 that generates transition section function data.

The transition section function data generated by the transition section function data generating unit 164 may be determined based on the wear amount of the brake pad 140.

The transition section function data generating unit 164 according to an embodiment of the present disclosure may include a memory (not shown) that stores the transition section function data on the transition section. After the transition section function data is experimentally obtained, the data may be converted into a Look-Up Table (LUT) form and stored in the memory. The function data stored in the memory is called and used to calculate the braking force. On the other hand, the transition section function data generating unit 164 according to another embodiment of the present disclosure includes a transition section function data calculation unit (not shown) that calculates the transition section function based on the position of the piston 131 in real time to generate a function.

The braking force calculation unit 166 calculates the braking force based on the position of the piston 131.

When the piston 131 moves toward the wheel disc 150, the braking force may be calculated by putting the position of the piston 131 into the rising section function $f_a$ (see FIG. 6). However, when the piston 131 moves to the opposite side of the wheel disc 150 and then moves toward the wheel disc 150, the braking force is calculated using the transition section function in the position section of the piston 131 in which the transition section function value is smaller than the value of the rising section function $f_a$ (see FIG. 6). In other words, when the moving direction of the piston 131 is changed from the direction opposite to the wheel disc 150 to the direction of the wheel disc 150, the braking force calculation unit 166 follows a function with a smaller function value among the transition section function and the rising section function $f_a$ (see FIG. 6) to calculate the braking force.

When the piston 131 moves in the opposite direction to the wheel disc 150, the braking force may be calculated by putting the position of the piston 131 into the falling section function $f_r$ (see FIG. 6). However, when the piston 131 moves toward the wheel disc 150 and then moves to the opposite side of the wheel disc 150, the braking force is calculated using the falling section function $f_r$ (see FIG. 6) in the position section of the piston 131 in which the transition section function value is smaller than the value of the falling section function $f_r$ (see FIG. 6). In other words, when the moving direction of the piston 131 is changed from the direction of the wheel disc 150 to the direction opposite to the wheel disc 150, the braking force calculation unit 166 follows a function with a larger function value among the transition section function and the falling section function $f_r$ (see FIG. 6) to calculate the braking force. By configuring the electro-mechanical brake device in this way, it is possible to accurately estimate the braking force even when the moving direction of the piston 131 is changed.

Figure 9:
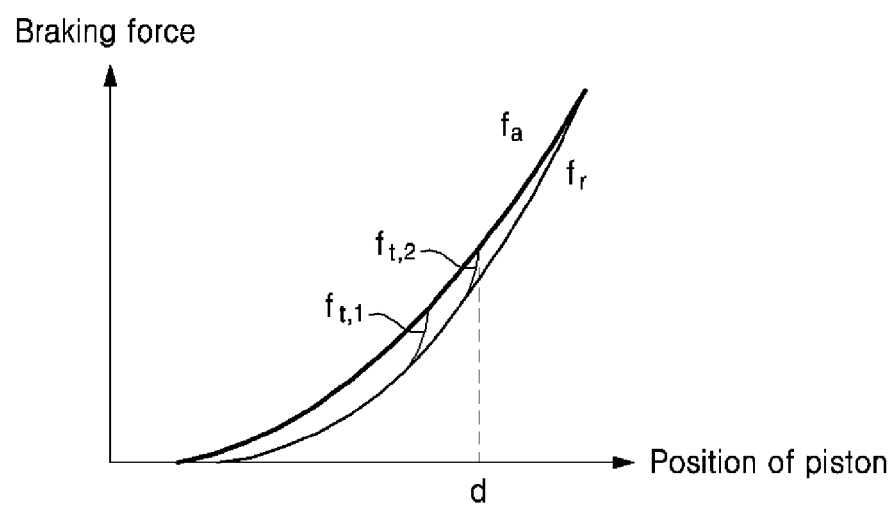
FIG. 9 is a graph showing a ramp-up interval function, a ramp-down interval function, and a transition interval function according to an embodiment of the present disclosure.

FIG. 9 is a graph showing a ramp-up interval function, a ramp-down interval function, and a transition interval function according to an embodiment of the present disclosure.

Referring to FIG. 9, by reflecting the hysteresis characteristics of the braking force according to the position of the piston 131, the transition section functions $f_{t,1}$ and $f_{t,2}$ may have a positive slope. At any position of the piston 131, the differential value of the transition section functions $f_{t,1}$ and $f_{t,2}$ may be greater than the differential value of the rising section function $f_a$ (see FIG. 9) and the differential value of the falling section function $f_r$ (see FIG. 9).

In order to more easily generate the transition section functions $f_{t,1}$ and $f_{t,2}$ the transition section functions $f_{t,1}$ and $f_{t,2}$ may be linear functions with positive slopes. A plurality of transition section functions $f_{t,1}$ and $f_{t,2}$ present between the rising section and the falling section may be linear functions having the same slope.

The control unit 160 according to an embodiment of the present disclosure determines the wear degree of the brake pad 140 by measuring a distance between the contact point and the lowest point of the stroke of the piston 131.

Figure 10:
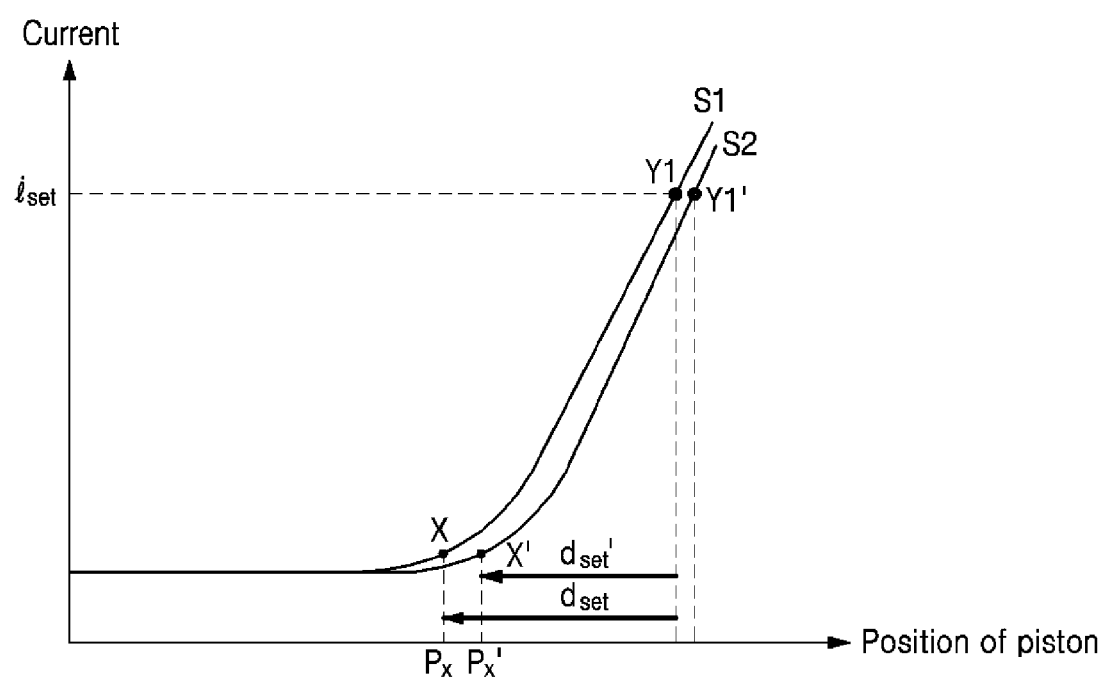
FIG. 10 is a graph depicting how braking force changes with respect to the position of a piston in the case of abrasion of a brake pad according to an embodiment of the present disclosure.

FIG. 10 is a graph depicting how braking force changes with respect to the position of a piston in the case of abrasion of a brake pad according to an embodiment of the present disclosure.

Referring to FIG. 10, S1 is a graph showing the intensity of current according to the position of the piston 131. S2 is a graph showing the intensity of current according to the position of the piston 131 when the brake pad 140 is further worn compared to that of S1. In FIG. 10, the hysteresis characteristics are not shown so as to clearly represent the graph between the position of the piston 131 and the braking force according to the wear degree of the brake pad 140. However, the following description is applied to all of the rising section function $f_a$ (see FIG. 6), the transition section function, and the falling section function $f_r$ (see FIG. 6).

If the brake pad 140 is worn, the contact point moves from X to X'. That is, the contact point moves toward the wheel disc 150. As the brake pad 140 is worn, the rigidity of the brake pad 140 increases, so that the slope increases in the linear section b (see FIG. 5). A first check point is moved from Y1 to Y1'. Thus, a preset distance, which is a distance from the first position to the second position, should be differently set from $d_{set}$ to $d_{set}'$. That is, the preset distance should be differently set depending on the wear degree of the brake pad 140.

The control unit 160 may measure the absolute distance of the contact point X, and determine that the wear degree of the brake pad 140 increases as the absolute distance increases. Here, the absolute distance of the contact point X means the operating distance from the lowest point of the stroke to the contact point. The control unit 160 may find and apply the value of $d_{set}'$ according to the wear degree of the brake pad 140. The variation of $d_{set}$ according to the wear degree of the brake pad 140 may be experimentally obtained, converted into the Look-Up Table (LUT) form, and stored in the memory of the control unit 160. That is, the control unit 160 may calculate the absolute distance of the brake pad 140 to determine the wear degree of the brake pad 140, and convert the value of $d_{set}$ into the value of $d_{set}'$ to estimate the contact point X' of the worn brake pad 140.

As the brake pad 140 is worn, the differential value of the braking force function according to the position of the piston 131 is increased at any point of the piston 131. The electro-mechanical brake according to an embodiment of the present disclosure determines the rising section function $f_a$ (see FIG. 6), the transition section function, and the falling section function $f_r$ (see FIG. 6) based on the wear amount of the brake pad 140. The hysteresis data storage unit 161 according to an embodiment of the present disclosure stores data on a plurality of rising section functions $f_a$ (see FIG. 6) determined based on the wear amount of the brake pad 140 and data on a plurality of falling section functions $f_r$ (see FIG. 6) determined based on the wear amount of the brake pad 140.

The wear amount of the brake pad 140 may be determined by measuring the distance from the lowest point of the stroke of the piston 131 to positions $p_x$ and $p_{x'}$ of the piston 131 when the brake pad 140 starts to contact the wheel disc 150.

Referring back to FIGS. 1 to 4, contact point calculation and stiffness calibration for an electro-mechanical brake according to the present disclosure will be described in detail.

The contact point calculation unit 165 may calculate and/or calibrate a contact point based on the position of the piston 131 detected by the position detection unit 170 and the value of current applied to the motor 120 detected by the current detection unit 180. Specifically, the contact point calculation unit 165 may calculate and/or calibrate the contact point based on the position of the piston 131 detected by the position detection unit 170 with respect to a plurality of specified current values and the position of the piston of the piston 131 measured with respect to the plurality of specified current values. In this way, the contact point may be accurately calculated and/or calibrated by using data from a plurality of points in calculating and/or calibrating the contact point. Also, it is possible to calculate force more accurately, such as clamping force or braking force, and to reduce variation in calculation between samples.

The plurality of specified current values may be determined based on a current applied to the motor 120 and a force measured with respect to the current applied to the motor 120. Here, the force may refer to a clamping force or a braking force. The plurality of specified current values may be current values in an area where the force changes linearly with the current applied to the motor 120 within a predetermined margin of error—that is, current values in an area where the force changes at a relatively constant rate. Using the current values in such an area, the contact point may be calculated and/or calibrated more accurately, and as a result, the force may be accurately calculated.

As described above, a current for the motor 120 used to calculate and/or calibrate the contact point may be filtered by the filter, but a time delay may occur due to the filtering. In this case, the motor 120 may be controlled (e.g., ramping) by using the motor controller 167 so that the piston 131 is moved at a constant speed for a preset amount of time in order to calculate and/or calibrate the contact point, which generates the same amount of time delay across the entire range, thereby solving the problem of time delay due to filtering.

The contact point calculation unit 165 may calculate and/or calibrate a contact point for each vehicle wheel, especially, front and rear vehicle wheels. Each vehicle wheel may vary in the value of current required for the motor 120 to brake, the position of the piston 131, clamping force, braking force, stiffness, and so forth. By calculating and/or calibrating a contact point for each vehicle wheel, the electro-mechanical brake 100 according to the present disclosure is able to accurately calculate and/or calibrate the contact point despite variations that may be generated between the vehicle wheels and as a result, allowing for accurate calculation of force.

The electro-mechanical brake 100 according to the present disclosure may further include a stiffness calibration unit (not shown). The stiffness calibration unit may calibrate the stiffness of a caliper used for EMB based on the position of the piston 131 and the value of current applied to the motor 120. Here, the stiffness refers to the slope of a force-position graph such as shown in FIG. 6, that is, the rate of change of force with respect to position of the piston 131. Also, the stiffness may refer to the slope of a current-position graph, such as shown in FIG. 4, since the current applied to the motor 120 of the electro-mechanical brake 100 is proportional to the force.

The stiffness calibration unit may calculate a stiffness weight based on a current detected by the current detection unit 180 with respect to a specified position of the piston 131 and a current measured with respect to the specified position of the piston 131, and may calibrate the stiffness of the caliper based on the stiffness weight. Here, the stiffness weight may be calculated using the following Equation 1, and the specified position of the piston 131 may be plural.

$$\text{Stiffness weight} = \frac{\text{Current detected by current detection unit} - \text{Measured current}}{\text{Measured current}} \quad [\text{Equation 1}]$$

Since the stiffness calibration unit calibrates the stiffness based on the value of current detected by the current detection unit 180 with respect to a specified position of the piston 131 and the value of current measured with respect to the specified position of the piston 131, it is possible to accurately calculate the force of the electro-mechanical brake 100 without a force sensor such as a load sensor.

The stiffness calibration unit may calibrate stiffness based on information on the contact point calibrated and/or calibrated by the contact point calculation unit 165. The stiffness calibration unit may calibrate stiffness based on the rate of change of position of the contact point which is calculated by Equation 2:

$$\text{Rate of change of position of contact point} = \quad [\text{Equation 2}]$$

$$\frac{\frac{\text{Current }(n)\text{ detected by current detection unit} - \text{Measured current }(n)}{\text{Measured current }(n) - \text{Measured current }(n-1)}}{\text{Rate of change of position of piston}}$$

wherein n denotes the position of the piston 131 at the current time when the rate of change of position of the contact point is calculated, and (n−1) denotes the position of the piston 131 at the previous time. It is possible to calibrate stiffness based on the rate of change of position of the contact point which is calculated by using the position of the piston 131 and the current applied to the motor 120.

If the stiffness with respect to the position of the piston 131 is relatively constant, for example, such as in the rear wheels of the vehicle, the calculations are done in the reverse order. That is, the rate of change of position of the contact point may be calculated by using Equation 2 first and then used to calculate and/or calibrate the contact point, thereby allowing for more accurate calculation and/or calibration of the contact point.

Figure 11:
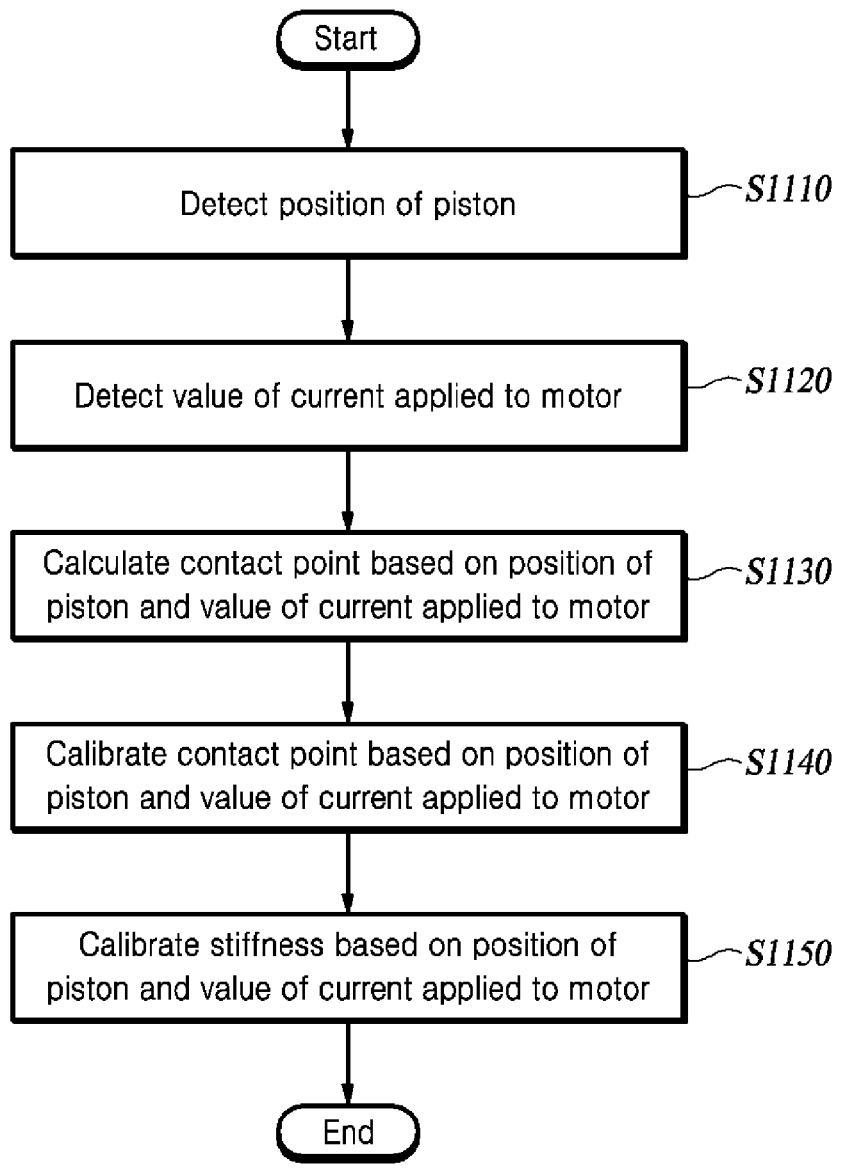
FIG. 11 is a flowchart of a control method of an electro-mechanical brake according to an embodiment of the present disclosure.
Figure 12A:
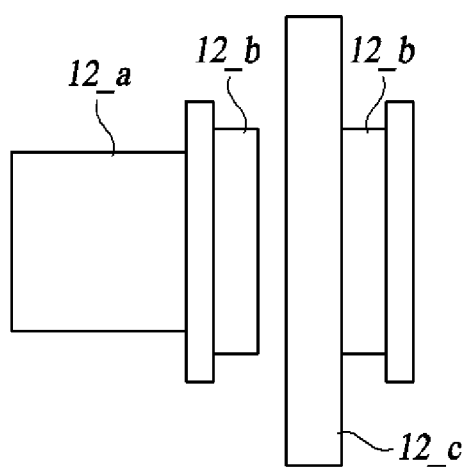
FIGS. 12A, 12B and 12C are view showing a construction of a conventional electro-mechanical brake.
Figure 12B:
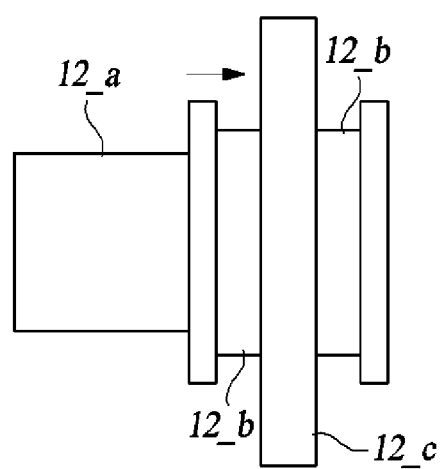
Figure 12C:
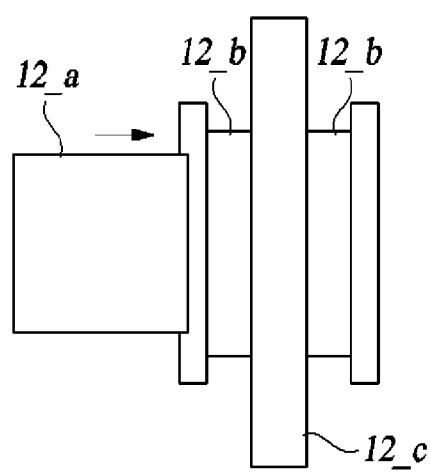

FIG. 11 is a flowchart of a control method of an electro-mechanical brake according to an embodiment of the present disclosure.

The position detection unit detects the position of the piston (S1110). The position detection unit 170 detects the position of the piston 131 which is moved by driving the motor 120. The position detection unit 170 may transmit information on the position of the piston 131 to the contact point calculation unit 165, the stiffness calibration unit, and so on.

The current detection unit detects the value of current applied to the motor (S1120). The current detection unit 180 detects the value of current applied to the motor 120 of the electro-mechanical brake 100. The current detection unit 180 may transmit information on the value of current applied to the motor 120 to the contact point calculation unit 165, the stiffness calibration unit, and so on.

The contact point calculation unit calculates a contact point based on the position of the piston and the value of current applied to the motor (S1130). The contact point calculation unit may receive information on the position of the piston 131 from the position detection unit 170. The contact point calculation unit 165 may receive information on the value of current applied to the motor 120 from the current detection unit 180. The contact point calculation unit 165 may calculate the contact point based on the position of the piston 131 detected by the position detection unit 170 and the value of current applied to the motor 120.

Specifically, the contact point calculation unit 165 may calculate the contact point based on the position of the piston 131 detected by the position detection unit 170 with respect to a plurality of specified current values and the position of the piston 131 measured with respect to the plurality of specified current values.

The plurality of specified current values may be determined based on a current applied to the motor 120 and a force measured with respect to the current applied to the motor 120. The plurality of specified current values may be current values in an area where the force changes linearly with the current applied to the motor 120 within a predetermined margin of error—that is, current values in an area where the force changes at a relatively constant rate.

The contact point calculation unit 165 may calculate and/or calibrate a contact point for each vehicle wheel, especially, front and rear vehicle wheels. By calculating and/or calibrating a contact point for each vehicle wheel, the contact point may be accurately calculated despite variations that may be generated between the vehicle wheels and as a result, allowing for accurate calculation of force.

The contact point calculation unit calibrates the contact point based on the position of the piston and the value of current applied to the motor (S1140). The contact point calculation unit 165 may calibrate the contact point based on the position of the piston 131 detected by the position detection unit 170 and the value of current applied to the motor 120 detected by the current detection unit 180.

The contact point calculation unit may calibrate the contact point based on the position of the piston 131 detected by the position detection unit 170 with respect to a plurality of specified current values and the position of the piston 131 measured with respect to the plurality of specified current values. The plurality of specified current values may be determined based on a current applied to the motor 120 and a force measured with respect to the current applied to the motor 120.

The contact point calculation unit 165 may calculate a contact point for each vehicle wheel, especially, front and rear vehicle wheels.

The stiffness calibration unit calibrates the stiffness of a caliper based on the position of the piston and the value of current applied to the motor (S1150). The stiffness calibration unit may calibrate the stiffness based on the position of the piston 131 and the value of current applied to the motor 120. The stiffness calibration unit may calculate a stiffness weight based on the value of current detected by the current detection unit 180 with respect to a specified position of the piston 131 and the value of current measured with respect to the specified position of the piston 131, and may calibrate the stiffness based on the stiffness weight. As described above, the stiffness weight may be calculated using Equation 1, and the specified position of the piston 131 may be plural.

The stiffness calibration unit may calibrate the stiffness of the caliper based on information on the contact point calculated by the contact point calculation unit 165. The stiffness calibration unit may calibrate the stiffness based on the rate of change of position of the contact point which is calculated by Equation 2. The stiffness may be calibrated based on the rate of change of position of the contact point which is calculated by using the position of the piston 131 and the current applied to the motor 120.

If the stiffness relative to the position of the piston 131 is relatively constant, for example, such as in the rear wheels of the vehicle, the calculations are done in the reverse order. That is, the rate of change of position of the contact point may be calculated by using Equation 2 first and then used to calculate and/or calibrate the contact point, thereby allowing for more accurate calculation and/or calibration of the contact point.

According to an embodiment of the present disclosure, an electro-mechanical brake is able to estimate force based on a current applied to a motor and the position of a piston.

According to an embodiment of the present disclosure, an electro-mechanical brake is able to accurately calculate force by calculating and/or calibrating a contact point based on a current applied to a motor and the position of a piston.

According to an embodiment of the present disclosure, an electro-mechanical brake is able to accurately calculate force by calibrating the stiffness of a caliper and an abrasion of pads based on a current applied to a motor and the position of a piston.

According to an embodiment of the present disclosure, an electro-mechanical brake is able to accurately calculate braking force based on a hysteresis characteristic of the braking force relative to the position of a piston.

Although the processes in each flowchart in the present disclosure have been described as being sequentially performed, this is only an exemplary description of the technical concept of some of the embodiments of the present disclosure. In other words, those skilled in the art will appreciate that various modifications and changes are possible by changing the order of the processes in a flowchart or performing one or more of the processes in parallel, without departing from the essential characteristics of some of the embodiments of the present disclosure. Therefore, the flowcharts are not limited to a time-series order.

Various implementations of the units, systems and techniques described herein can be realized in digital electronic circuitry, integrated circuitry, a field programmable gate array (FPGA), an application specific integrated circuit (ASIC), computer hardware, firmware, software, and/or combinations thereof. These various implementations may include being implemented in one or more computer programs executable on a programmable system. The programmable system includes at least one programmable processor (which may be a special purpose processor or a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable recording medium".

The computer-readable recording medium includes all kinds of recording devices that store data readable by a computer system. Such a computer-readable recording medium may be a non-volatile or non-transitory medium such as ROM, CD-ROM, a magnetic tape, a floppy disk, a memory card, a hard disk, a magnetic optical disk, a storage device, and the like. Also, it may further include a transitory medium such as a data transmission medium. Further, the computer-readable recording medium may be distributed to computer systems connected via a network so that computer-readable code can be stored and executed in a distributed manner.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electro-mechanical brake comprising
   a piston to push a brake pad towards a wheel disc by driving a motor in a vehicle;
   a position detection unit that detects a position of the piston;
   a current detection unit that detects a value of current applied to the motor; and
   a contact point calculation unit that calculates a contact point, which is where the piston is located when the brake pad starts to come into contact with the wheel disc, based on the position of the piston and the value of the current applied to the motor, or based on a first position of the piston detected by the position detection unit with respect to a plurality of specified current values and a second position of the piston measured with respect to the plurality of specified current values, wherein:
   the plurality of specified current values is determined based on the current applied to the motor and a force measured with respect to the current applied to the motor, and
   the plurality of specified current values is a plurality of current values in an area where the force changes linearly with the current applied to the motor within a predetermined margin of error.

2. The electro-mechanical brake of claim 1, wherein the contact point calculation unit calibrates the contact point based on the first position of the piston and the second position of the piston.

3. The electro-mechanical brake of claim 1, further comprising a motor controller that controls the motor so that the piston moves towards the wheel disc for a preset amount of time.

4. The electro-mechanical brake of claim 3, wherein the motor controller controls the motor so that the piston moves towards the wheel disc for the preset amount of time when the vehicle is stopped.

5. The electro-mechanical brake of claim 1, wherein the force is a clamping force or a braking force.

6. The electro-mechanical brake of claim 1, wherein the current detection unit includes:
   a current sensor that measures a current applied to the motor; and
   a filter that removes noise from the current measured by the current sensor.

7. The electro-mechanical brake of claim 1, wherein the contact point calculation unit determines an amount of abrasion of the brake pad based on a distance between the contact point and a lowest stroke position of the piston.

8. The electro-mechanical brake of claim 1, wherein the contact point calculation unit calculates the contact point for each of front and rear wheels of the vehicle.

9. The electro-mechanical brake of claim 1, further comprising a stiffness calibration unit that calibrates stiffness of a caliper based on the position of the piston and the value of the current applied to the motor.

10. The electro-mechanical brake of claim 9, wherein the stiffness calibration unit calibrates the stiffness based on a value of a first current detected by the current detection unit with respect to a specified position of the piston and a value of a second current measured with respect to the specified position of the piston.

11. The electro-mechanical brake of claim 10, wherein the stiffness calibration unit calculates a stiffness weight based on the value of the first current and the value of the second current, and calibrates the stiffness based on the stiffness weight.

12. The electro-mechanical brake of claim 10, wherein the specified position of the piston includes a plurality of positions.

13. The electro-mechanical brake of claim 9, wherein the stiffness calibration unit calibrates the stiffness based on information on the contact point calculated by the contact point calculation unit.

14. A control method of an electro-mechanical brake comprising a piston to push a brake pad towards a wheel disc by driving a motor in a vehicle, the control method comprising:
   a position detection process including detecting, by a position detection unit, a position of the piston;
   a current detection process including detecting, by a current detection unit, a value of current applied to the motor; and
   a contact point calculation process including calculating, by a contact point calculation unit, a contact point, which is where the piston is located when the brake pad starts to come into contact with the wheel disc, based on the position of the piston and the value of current applied to the motor, or
   based on a first position of the piston detected by the position detection unit with respect to a plurality of specified current values and a second position of the piston measured with respect to the plurality of specified current values, wherein:

the plurality of specified current values is determined based on the current applied to the motor and a force measured with respect to the current applied to the motor, and the plurality of specified current values is a plurality of current values in an area where the force changes linearly with the current applied to the motor within a predetermined margin of error.

15. The control method of claim 14, further comprising a contact point calibration process including calibrating, by the contact point calculation unit, the contact point based on the first position of the piston and the second position of the piston.

16. The control method of claim 14, further comprising a stiffness calibration process including calibrating, by a stiffness calibration unit, a stiffness of a caliper based on the position of the piston and the value of current applied to the motor.

17. The control method of claim 16, wherein the stiffness calibration process includes calibrating, by the stiffness calibration unit, based on a value of a first current detected in the current detection process with respect to a specified position of the piston and a value of a second current measured with respect to the specified position of the piston.

18. The method of claim 16, wherein the stiffness calibration process includes calibrating, by the stiffness calibration unit, the stiffness based on information on the contact point calculated in the contact point calculation process.

* * * * *